Feb. 14, 1967    M. STRASSBERG    3,304,137
DOUBLE-THRUST BEARINGS

Filed Sept. 8, 1964    3 Sheets-Sheet 1

INVENTOR
MAXIMILIEN STRASSBERG
By Irwin S. Thompson
ATTY.

Feb. 14, 1967    M. STRASSBERG    3,304,137
DOUBLE-THRUST BEARINGS

Filed Sept. 8, 1964    3 Sheets-Sheet 2

INVENTOR
MAXIMILIEN STRASSBERG
By Irwin S. Thompson
ATTY.

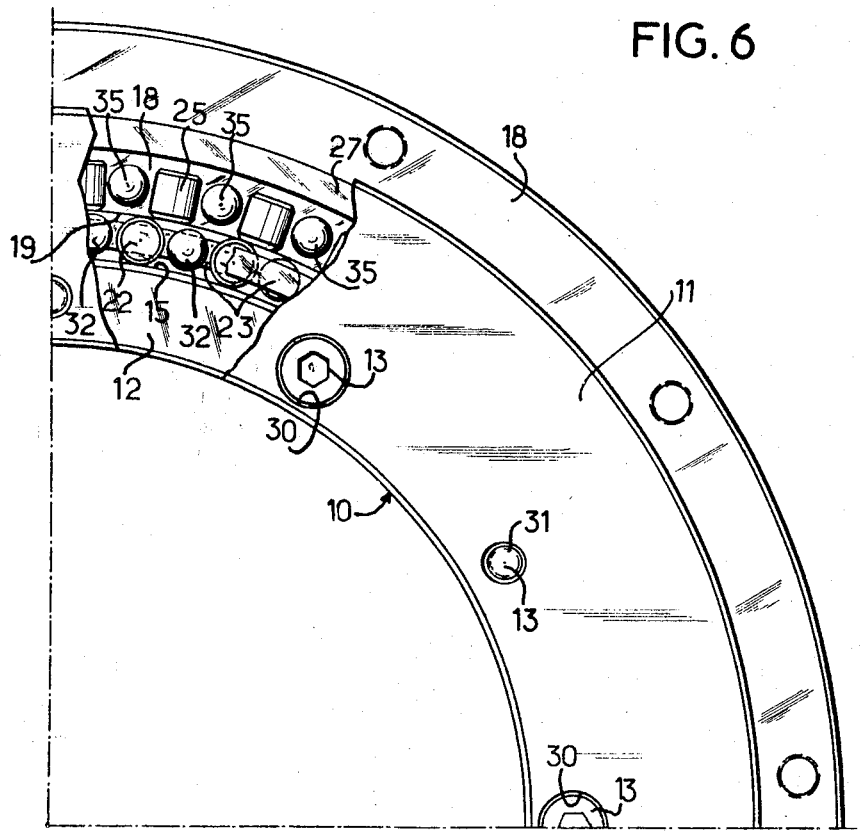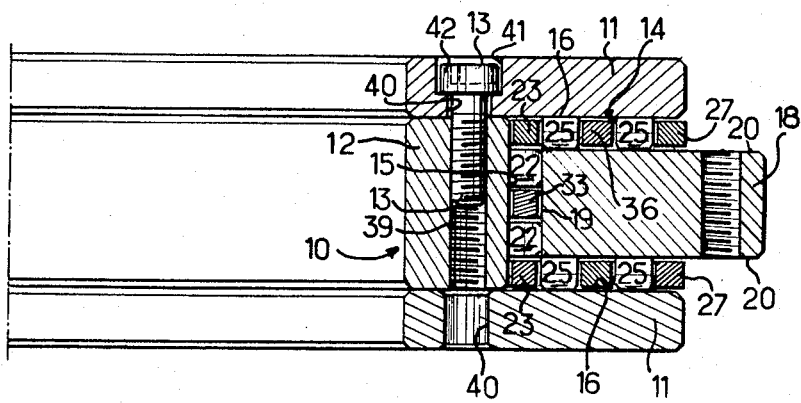

3,304,137
DOUBLE-THRUST BEARINGS
Maximilien Strassberg, 4 Rue de Voize, Neuilly-Plaisance,
Seine-et-Oise, France
Filed Sept. 8, 1964, Ser. No. 394,771
Claims priority, application France, Sept. 10, 1963,
947,015; July 29, 1964, 983,420
4 Claims. (Cl. 308—174)

The present invention relates to improvements in bearings of the so-called "double-thrust" type, that is to say in bearings which permit the movement of a rotating part turning on a supporting member, without any possibility of axial displacement in either direction of the rotating part with respect to the supporting member.

These bearings are employed, as is well known, to support moving parts, for example spindles of machine tools.

The double-thrust bearings utilized at the present time are generally of complicated construction. Furthermore, in the majority of cases, they wear very rapidly.

The present invention has for its object the production of a double-thrust bearing which is of very simple design but which is however robust and adapted to withstand heavy loads, both axial and radial, this bearing being also capable of operation at high speed without the occurrence of harmful vibrations.

A double-thrust bearing according to the invention, of the kind comprising a ring provided with a U-section groove which opens radially and a further ring coaxial with the first said ring, which is engaged in the said groove and which has two transverse faces disposed respectively opposite the two lateral faces of the said groove, is especially characterized in that at least one series of cylindrical rollers giving radial support, having axes parallel to that of the first ring, is arranged on the one hand in contact with the bottom of the groove and in contact with an adjacent peripheral portion of the second ring, and on the other hand, with axial play, between two washers adjacent to the bottom of the groove and each arranged on one side of the second ring, while at least one series of axial-support cylindrical rollers having their axes convergent to the axis of the first ring is arranged on the one hand in contact with each of the lateral faces of the groove and of the associated transverse face of the second ring, and on the other hand, with axial play, between one of the washers previously mentioned and a second washer housed with play between the corresponding lateral face of the groove and the second ring.

According to a further characteristic feature of the invention, there is associated with each of the series of rollers, a series of balls having a diameter slightly less than that of the corresponding rollers, the rollers and the balls of the series thus associated being arranged in such manner that a ball is interposed between two consecutive rollers.

By virtue of this arrangement, it is not necessary to provide cages in order to effect the spacing of the rollers and to prevent jamming. As the balls have a diameter less than that of the rollers, they simply ensure the spacing apart of the rollers and are not subjected in any way to the loads applied to the bearing.

In the case of especially heavy loads, the invention also provides for these loads, axial or radial, to be transferred onto several series of rollers arranged respectively side by side or one above the other.

Experience has shown that it is an advantage, again with the object of improving the operation of the rollers, to separate two adjacent series of rollers by a spacing-ring arranged between the adjacent end faces of the rollers of these two series.

In a preferred form of construction, the lateral faces of the groove in the first ring are constituted by the flat faces of two similar end-plates arranged on each side of a spacing washer, the periphery of which forms the bottom of the groove.

The clearances necessary for operation are provided during machining and are obtained with precision during assembly, which is particularly simple.

The characteristic features and advantages of the invention will further become apparent from the description which follows below, given by way of example only and without implied limitation, reference being made to the accompanying drawings, in which:

FIG. 6 is a partial view in plan, with parts broken away of a further form of construction of the double-thrust bearing according to the invention;

FIG. 7 is an axial half-section of an alternative embodiment of a bearing of this kind.

Figure 1:
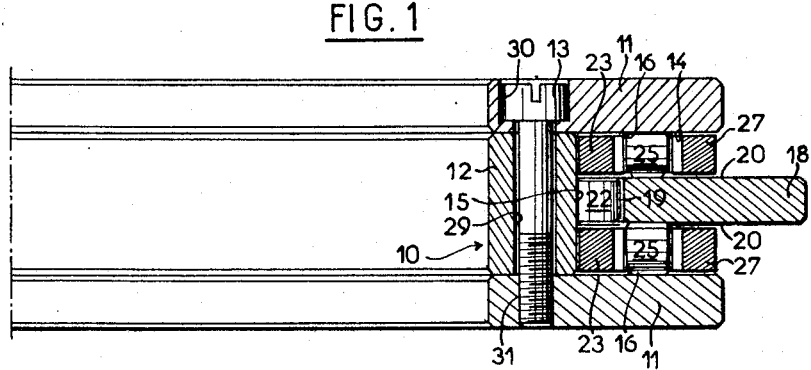
FIG. 1 is an axial half-section of a double-thrust bearing according to the invention.
Figure 2:
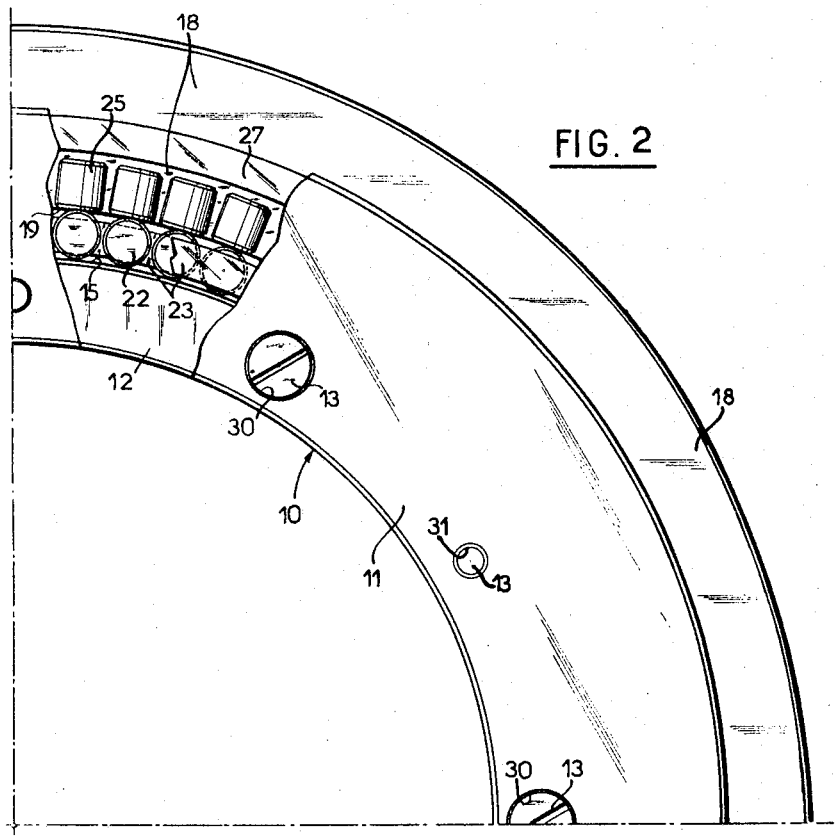
FIG. 2 is a partial view in plan of the bearing shown in FIG. 1.

In accordance with the form of construction chosen and shown in FIGS. 1 and 2, a bearing according to the invention comprises a ring 10 formed by two annular end-plates 11 and a spacing washer 12 arranged between these two end-plates, the end-plates and spacing washer being assembled together by screws 13 so as to form in the ring 10 a peripheral groove 14 of U-section, the bottom 15 of which is formed by the peripheral wall of the washer 12, and the lateral faces 16 by the inner faces of the end-plates 11.

In this groove 14 which opens radially, is engaged a second ring 18, coaxial with the end-plates, the edge 19 of which is arranged facing the bottom 15 and which has two transverse faces 20 disposed respectively opposite the two lateral faces 16 of the groove 14, and parallel to this latter.

A series of radial-support cylindrical rollers 22, having their axes parallel to that of the ring 10, is arranged between the bottom 15 of the groove 14 and the edge 19 of the ring 18, these rollers each being supported against the bottom 15 and the edge 19 by two diametrically-opposite generator lines.

These rollers 22 are held facing the edge 19 by two internal spacing washers 23, arranged around the spacing washer 12 and each facing one of the inner faces 16 of the end-plates 11. The rollers 22 are housed between these washers, the thickness of which is determined so as to permit an axial play of the said rollers, the latter being thus able to roll freely when the ring 10 and the second ring 18 are given a relative movement of rotation.

Another series of axial support cylindrical rollers 25 is arranged in each of the spaces formed between a lateral face 16 and a transverse face 20. The rollers 25 have their axes directed radially with respect to the first ring 10, these axes thus converging on the axis of the said ring and being arranged in the annular space formed by the faces 16 and 20 and by the edges, arranged facing each other, of the internal washer 23 and a similar outer washer 27, coaxial with the washer 23 and surrounding it. The diameters of the washers are determined so as to permit again in this case an axial play of the rollers and the free rolling action of these latter, the thickness of the washers being less than the diameter of the rollers 25.

Thus, each roller 25 is supported on an endplate 11 and on the second ring 18 by two diametrically-opposite generator lines, while the washers 23 and 27 are able to carry out slight axial and radial movements.

The axial forces applied between the first ring 10 and the second ring 18 are transferred to a large number of linear surfaces constituted by the generator lines of contact of the axial-support rollers 25, these linear surfaces amounting to a relatively large total superficial area in order to permit the bearing to withstand considerable loads without damage.

With regard to the radial forces applied between the first ring 10 and the second ring 18, these are absorbed in the same manner by the radial-support rollers 22.

There will be noted the great simplicity of construction of the bearing according to the invention, in which the bearing surfaces are solely cylindrical surfaces or flat surfaces arranged in planes perpendicular to the axes of the said cylindrical surfaces.

The assembly is also extremely simple, since it is only necessary to place the spacing washer 12 on one of the end-plates 11, to arrange the washers 23 and 27 corresponding to this end-plate and to assemble the rollers 25 in position between them. The second ring 18 is then placed on these rollers and the rollers 22 are then put in position between the first and second rings, the radii of the bearing surfaces 19 and 15 having been given values during the machining of these parts, such that their difference is equal to the diameter of the rollers 22, increased by the necessary rolling clearances.

In order to complete the assembly, the two other spacing washers are put in positon and between them a series of rollers 22, which are covered by the end-plate 11, subsequently fixed to the spacing washer 12 and to the other end-plate 11 by means of the screws 13.

No adjustment is necessary if, by machining, the height of the spacing washer 12 corresponds to the sum of the thickness of the ring 18 increased by twice the diameter of the rollers 25 and the necessary working clearances.

In order to simplify the machining, it is possible to utilize two absolutely identical end-plates 11 for each bearing. In this case, the housing of each assembly screw 13 consists of a bore 29 formed in the spacing washer 12 and having its extremities respectively facing a recess 30 for receiving the screw head, formed in one of the end-plates 11, and a bore 31 threaded to the diameter and pitch of the screw, formed in the other end-plate, and there can be provided in each end-plate an alternate series of such recesses 30 and threaded bores 31. In this way, when assembling, a recess 30 of one end-plate is arranged opposite a bore 31 of the other end-plate, the assembly screws 13 being introduced alternately through the outer face of each end-plate.

Figure 3:
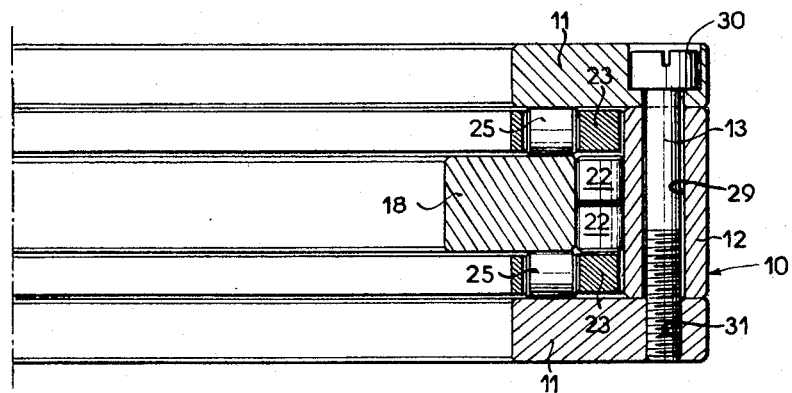
FIGS. 3 to 5 are axial half-sections of alternative forms of construction of the bearing according to the invention.
Figure 4:
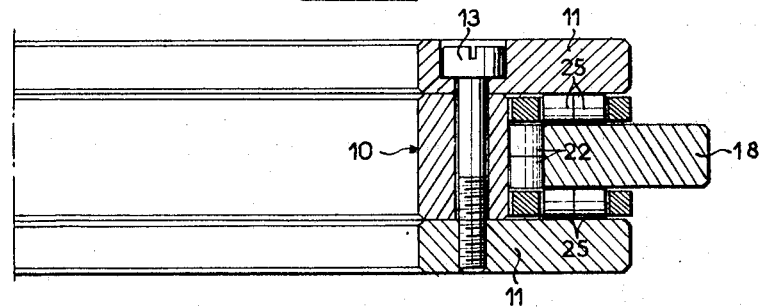
Figure 5:
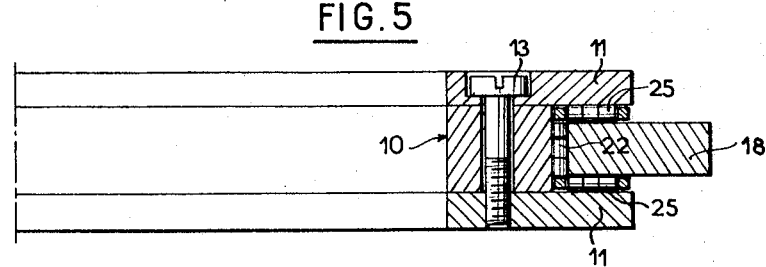

FIGS. 3 to 5 illustrate alternative forms of construction of the bearing according to the invention.

In the form of consturction shown in FIG. 3, the groove of the first ring 10 opens radially towards the inside of the said ring and the second ring 18 is mounted inside the first ring. In order to permit the bearing to withstand greater radial loads, the contact surface of the rollers 22 has been increased by increasing the length of the said rollers. In the example shown, two series of superposed rollers 22 have been provided.

In the alternative forms of FIGS. 4 and 5, the second ring 18 is on the outside, as in the case of FIG. 1, and not only the length of the radial-support rollers 22 has been increased, but also that of the axial-support rollers 25.

In the case of FIG. 4, each series of rollers is doubled, while in the case of FIG. 5 each series is tripled. The dividing-up of the axial supporting surfaces into a number of concentric series of rollers enables the length of each of the rollers employed to be reduced and renders negligible the effect of the difference of rolling speeds existing between the outer and inner extremities of each roller.

In the form of construction shown in FIG. 6, there is associated with the series of radial-support rollers 22, a series of balls 32 having a diameter slightly less than that of the rollers, a ball 32 being arranged between two consecutive rollers 22. The rollers 22 and balls 32 are held opposite the edge 19 by two internal spacing washers 23 which surround the spacing washer 12. The thickness of the washers is chosen so as to permit axial play of the rollers 22. The latter support the radial loads alone, the balls 32 having the sole function of spacing apart and preventing the rollers jamming together.

Another series of balls 35 is associated with each of the series of axial-support rollers 25, these balls having a diameter less than that of the rollers and being placed in a position such that two consecutive rollers are separated by one of these balls.

External washers 27 enclose the rollers 25 and the balls 35, and are arranged so as to permit free rolling of the rollers which support alone the axial loads, in this case also the balls ensuring solely the spacing of the rollers and preventing them from jamming.

FIG. 7 shows an alternative form of construction in which, in order to augment the contact surfaces of the rollers 22 and 25, the length of these rollers has been increased, two superposed series of rollers 22 and two series of rollers 25, arranged side by side, being provided. Balls 32 and 35 are associated with these rollers as in the previous case.

According to this alternative form, a spacing washer 33, similar to the washers 23, is arranged between the inner end faces of the rollers 22 of the two series of radial-support rollers, and co-operates with the balls 32 so as to reduce friction during operation.

Similarly, a washer 36, concentric with the washers 23 and 27, is arranged between the rollers of the series of rollers 25.

It will of course be understood that if the radial-support rollers or the axial-support rollers are constituted by more than two series of these rollers, the number of spacing washers will be increased proportionately.

The forms of construction shown in FIGS. 6 and 7 also represent a simplification of the assembly of the parts constituting the first ring 10 and comprising the spacing washer 12 and the annular end-plates 11 coupled together by screws 13. In this assembly, a series of threaded holes 39 having a diameter and pitch corresponding to the diameter and pitch of the screws 13 is formed in the spacing washer 12, while in each of the end-plates are formed bores 40 having a diameter slightly greater than that of the holes 39, intended to come opposite the said holes, one bore 40 in two being provided with an entry recess 41 adapted to receive the head of a screw 13.

The assembly is effected by first fixing one of the end-plates 11 to the washer 12 by the screws 13, the heads of which are housed in the reecsses 41 in the manner shown in FIG. 7. Then, after the rollers, balls, washers and second ring, the other end-plate is fixed in its turn on the washer 12, this end-plate being displaced by a space with respect to the other, so that the screws 13 which provide its fixing and are arranged as above, occupy the holes 39 which have been left free. It will be noted that in this case also, the end-plates 11 are similar to each other, which permits of a simplification of manufacture, and a lower cost, but that furthermore they may be removed form the washer 12 independently of each other. In addition, the part of a threaded hole 39 left free by the screw 13 is utilized for fixing the bearing on the mechanism or member which it equips.

It will of course be understood that the present invention is not limited to the forms of construction described and shown, it being possible to envisage numerous alternatives within the scope of the invention, directed in particular to the number of series of supporting rollers.

What I claim is:

1. A double-thrust bearing unit comprising a spacing washer, two end plates arranged on each side of said spacing washer, each end plate having an inner flat face which constitutes one of the lateral faces of a radially opening groove of U-section the bottom of which is constituted by a periphery of said spacing washer, a ring which is coaxial with said spacing washer and which has two transverse faces disposed respectively opposite the two lateral faces of the groove, at least one series of cylindrical radial-support rollers with axes parallel to that of said ring disposed in contact with the bottom of said groove and in contact with the adjacent peripheral edge of said ring, two first washers adjacent the bottom of said groove and each disposed on one side of said rollers, said rollers having axial play between said first washers, at least one series of cylindrical axial support rollers having their axes convergent on the axis of said ring and disposed in contact with each of the lateral faces of said groove and with the associated transverse face of said ring, and second washers housed with play between each lateral face of said groove and the associated transverse face of said ring, said axial support rollers being housed with axial play between said first and second washers, and screws securing said end plates to said spacing washer.

2. A double-thrust bearing unit as claimed in claim 1, in which said spacing washer is provided with a series of threaded holes while each of said end plates has a series of bores arranged so as to come opposite said holes during assembly, every other bore being provided with a recess for housing the head of a screw.

3. A double-thrust bearing unit as claimed in claim 1, and a series of balls associated with each of the series of rollers and having a diameter slightly less than that of the associated rollers, the rollers and the balls of the series thus associated being arranged in such manner that a ball is interposed between two consecutive rollers.

4. A double-thrust bearing unit as claimed in claim 1, adapted for the case of particularly heavy loads, in which at least one series of support rollers comprises a plurality of rows of rollers disposed side by side.

References Cited by the Examiner

UNITED STATES PATENTS

| 480,025 | 8/1892 | Montague et al. | 308—206 |
| 1,776,647 | 9/1930 | Zubler | 308—174 |

FOREIGN PATENTS

| 1,066,813 | 10/1959 | Germany. |
| 53,254 | 2/1917 | Sweden. |

MARTIN P. SCHWADRON, *Primary Examiner.*

FRANK SUSKO, *Examiner.*